Oct. 8, 1957  MASAKICHI KANDA  2,809,226
DRY CELL
Filed March 9, 1954

INVENTOR
MASAKICHI KANDA
By Linton and Linton
ATTORNEYS

United States Patent Office 2,809,226
Patented Oct. 8, 1957

2,809,226

DRY CELL

Masakichi Kanda, Ota-ku, Tokyo, Japan

Application March 9, 1954, Serial No. 415,124

1 Claim. (Cl. 136—133)

The present invention relates to electrolytic dry cell batteries and is more specifically concerned with an improvement in batteries of that type.

The principal object of the invention is to provide a dry cell battery having a greater capacity and a longer life than similar batteries as heretofore known.

It is a further and important object of the invention to provide a dry cell battery which is substantially non corrosive and which is strongly resistant to deformation or breakage.

In the accompanying drawings wherein one example of a battery according to the invention is disclosed:

Figure 1:
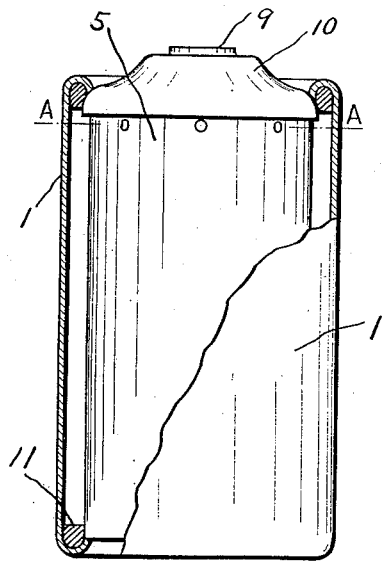
Fig. 1 is a side elevation of the present battery with a portion of the outer casing broken away.
Figure 2:
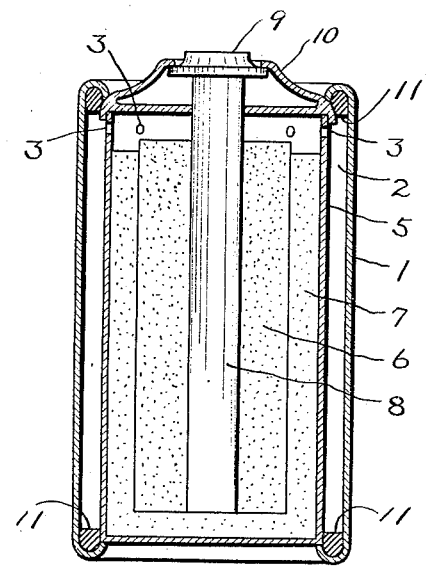
Fig. 2 is a longitudinal section through the present battery.
Figure 3:
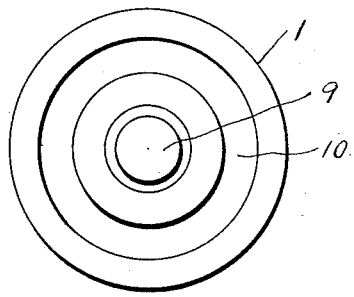
Fig. 3 is a top view of the battery.
Figure 4:
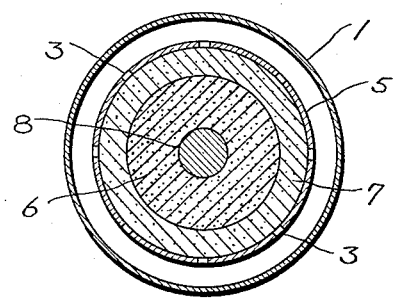
Fig. 4 is a cross sectional view taken on line A—A of Fig. 1.

Referring now more in detail to the accompanying drawings wherein like and corresponding parts are designated by similar reference characters, numeral 1 designates the outer relatively strong casing which surrounds the outer periphery of a zinc open topped container with the casing spaced from the container providing a space 2 therebetween. Container 5 has a series of openings 3 formed through the open end portion thereof. An anticorrosive film 4 coats both the outer periphery of said container 5 and the inner face of casing 1.

An active material 6, which as in known batteries may be a depolarizing material, fills the space between an electrolytic glutinous material 7 and a carbon rod 8 in said container up to but beneath openings 3. Zinc container 5 forms the negative electrode of the battery, while the carbon rod 8 extending from the open end of said container provides the positive pole. A cap 9 is mounted upon said rod and extends through an insulating cover 10 for closing the open end of said container.

The space 2 between said container and said casing are sealed at the bottom and top by an insulating packing 11.

In operation the electrolytic material 7 and depolarizer are impregnated with a liquid which in known batteries is for example a solution of sal ammoniac and zinc chloride. This liquid in the present battery as well as gases which may form coming from said filler materials pass through openings 3 and into space 2 which is coated with an anti-corrosive film and is protected from corrosion thereby. In conventional batteries considerable space in the zinc container had to be left vacant to take care of such gases and waste liquids, but in the present battery, the container 5 can be substantially filled with the absorbent and depolarizer whereby the capacity of the battery is relatively increased, the life of the present battery is much greater than those heretofore known and leakage of gas and electrolytic fluid is prevented. Thus, casings for the battery or connected equipment is not corroded thereby. Also the strong outer casing 1 protects container 5 for minimizing the possibility of deformation or breakage thereof.

I claim:

An improvement in electrolytic dry cells consisting of an open top cylindrical zinc container forming the negative electrode of said battery and having a series of openings therethrough around the top portion thereof, a carbon rod extending in said container through the open top thereof and forming the positive pole of said battery, absorbing and depolarizing material filling said container around said rod up to, but below said series of openings, means closing the open end of said container with said rod extending therethrough, an outer case surrounding and spaced from the outer periphery of said container for receiving fluid and gases therefrom through said openings, said case being of a material which is relatively stronger than said zinc container for retaining said fluid and gases and shielding said container and insulating packing sealing off the space between said container and said case.

References Cited in the file of this patent

UNITED STATES PATENTS

| | | |
|---|---|---|
| 778,912 | Stockigt | Jan. 3, 1905 |
| 1,500,477 | Warncke | July 8, 1924 |
| 1,711,176 | Moore | Apr. 30, 1929 |
| 1,925,374 | Deibel | Sept. 5, 1933 |
| 2,198,423 | Anthony | Apr. 23, 1940 |